United States Patent
Hatfield et al.

(10) Patent No.: US 7,036,240 B1
(45) Date of Patent: May 2, 2006

(54) MASTER STEERING CHECK FIXTURE

(75) Inventors: Bryan Hatfield, Gahanna, OH (US);
Douglas P. Decker, Hilliard, OH (US);
Marc D. Iman, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/979,968

(22) Filed: Nov. 3, 2004

(51) Int. Cl.
*G01D 21/00* (2006.01)

(52) U.S. Cl. .......................................... 33/600; 33/645

(58) Field of Classification Search ................. 33/645, 33/613, 600, 1 N, 1 PT, 1 CC, 203.12, 203.13, 33/203.14; 116/31
See application file for complete search history.

(56) References Cited

U.S. PATENT DOCUMENTS

| | | | | |
|---|---|---|---|---|
| 1,431,797 | A | * | 10/1922 | Hess ............................ 116/31 |
| 2,079,175 | A | * | 5/1937 | Kemp .......................... 116/31 |
| 2,147,598 | A | * | 2/1939 | Becker ......................... 116/31 |
| 2,316,188 | A | | 4/1943 | Rose |
| 2,355,211 | A | | 8/1944 | Erickson |
| 2,934,035 | A | * | 4/1960 | Hardy .......................... 116/31 |
| 3,465,577 | A | | 9/1969 | Donovan |
| 3,813,932 | A | | 6/1974 | Wallace |
| 3,889,527 | A | | 6/1975 | Wallace |
| 4,393,694 | A | | 7/1983 | Marten et al. |
| 4,422,242 | A | | 12/1983 | Stocker |
| 4,721,008 | A | | 1/1988 | Stoops et al. |
| 4,819,961 | A | * | 4/1989 | Henigue ...................... 280/775 |
| 4,831,744 | A | * | 5/1989 | Specktor et al. .............. 33/600 |
| 4,893,413 | A | | 1/1990 | Merrill et al. |
| 5,105,546 | A | | 4/1992 | Weise et al. |
| 5,165,179 | A | * | 11/1992 | Schoeninger ................. 33/600 |
| 5,291,660 | A | * | 3/1994 | Koerner .................... 33/203.12 |
| 5,544,522 | A | | 8/1996 | Little |
| 5,767,644 | A | * | 6/1998 | Hoing et al. ................. 318/489 |
| 5,855,072 | A | | 1/1999 | Nakaho |
| 6,076,269 | A | | 6/2000 | Sckino et al. |
| 6,158,132 | A | | 12/2000 | Kofink et al. |
| 6,305,217 | B1 | | 10/2001 | Mansfeld et al. |
| 6,519,865 | B1 | | 2/2003 | Yelverton |
| 6,848,187 | B1 | * | 2/2005 | Ito et al. ...................... 33/1 PT |
| 6,948,259 | B1 | * | 9/2005 | Hatfield et al. ................ 33/645 |
| 2002/0112360 | A1 | | 8/2002 | Brumbaugh |
| 2003/0159303 | A1 | * | 8/2003 | Crawford ...................... 33/645 |

* cited by examiner

*Primary Examiner*—R. Alexander Smith
(74) *Attorney, Agent, or Firm*—Rankin, Hill, Porter & Clark LLP; Vincent Ciamacco

(57) ABSTRACT

A fixture and method for checking whether a steering column alignment mark is properly placed. The fixture includes a wheel member that is affixed to a spline adaptor and that includes a plurality of surface alignment indicators. The fixture is rotatably linked to the steering column, and then the steering column, by manipulation of the fixture, is rotated the maximum amount in one direction. An offset reference indicator is selected from the face of the fixture by its alignment with a fixed point at the point of maximum rotation, and then the steering column is rotated the maximum amount in the opposite direction. An offset reference indicator is selected from the face of the fixture by its alignment with a fixed point at the point of maximum rotation. The numerals associated with the two selected offset reference indicators are compared and based upon this comparison, it is determined whether the alignment mark is properly positioned on the steering column.

14 Claims, 3 Drawing Sheets

MASTER STEERING CHECK FIXTURE

BACKGROUND OF THE INVENTION

1. Field of the Invention

The present invention is generally directed toward vehicle steering alignment and, more particularly, toward a fixture for checking a steering column alignment mark, which is subsequently used for properly orienting a steering wheel on the steering column.

2. Description of Related Art

In manufacturing automobiles, it is known to use an apparatus to mark the steering column to permit proper orientation of the steering wheel relative to the steering column. The steering column mark is placed in a location on the steering column corresponding to a neutral or centered position of the steering column. This method of marking the steering column and aligning the steering wheel with the steering column works well under normal circumstances.

However, it sometimes occurs that the apparatus used to mark the steering column is not operating correctly. In this situation, the mark is improperly positioned on the steering column, and this ultimately leads to a steering wheel that is misaligned relative to the steering column. A misaligned steering wheel will appear to be turned left or right when the steering column is neutral or centered (i.e., steering the vehicle "straight ahead"). Such misalignment must be corrected, preferably before the vehicle has left the factory, or else the driver will not feel comfortable with the steering performance.

Further complicating this problem is the fact that the error in the steering column mark placement may not be detected until much later in the assembly process, at which point numerous vehicles having potentially improper steering wheel alignments have been produced. Therefore, in addition to having to examine the steering column marking apparatus to determine and correct the problem that resulted in the improper placement of the alignment mark on the steering column, the steering wheel alignment on numerous vehicles must be checked and corrected, if necessary. Naturally, this is a time consuming process that creates significant expense and downtime for the manufacturer.

Therefore, there exists a need in the art for an apparatus and method for checking the accuracy of the steering column marking machine and, more particularly, checking whether the steering column alignment mark is, in fact, in the correct position on the steering column. Moreover, there exists a need in the art for such an apparatus and method that may be used in connection with several different vehicle models.

SUMMARY OF THE INVENTION

The present invention is directed toward an apparatus and method for checking the performance and accuracy of a steering column marking device and is related to the master steering check fixture and method as set forth in applicant's co-pending application Ser. No. 10/770,263, filed on Feb. 2, 2004, the disclosure of which is expressly incorporated herein in its entirety. Specifically, the apparatus and method check the position of a steering column alignment mark so as to ensure proper orientation of the subsequently installed steering wheel.

In accordance with the present invention, a steering check fixture includes a wheel member and a plurality of indicators thereon used to determine whether the steering column is properly aligned.

In further accordance with the present invention, the wheel member includes an annular outer portion, a central hub, and a series of arms extending between the outer portion and the hub. One of the arms and the hub include a reference indicator to facilitate orientation of the fixture relative to a stationary alignment mark. The annular outer portion of the wheel member includes a plurality of offset indicators to measure the degree of steering column misalignment.

The fixture also includes a spline adaptor that extends from the central hub and is adapted to be rotatably secured to the steering column. The spline adaptor fits over the steering column so as to leave the steering column alignment mark on the steering column exposed. The fixture reference indicator is aligned with the steering column alignment mark to properly orient the fixture relative to the steering column during placement of the fixture on the steering column.

In accordance with a method for checking whether a steering column alignment mark is properly positioned, the steering check fixture, after being attached to the steering column with the zero reference indicator and steering column alignment mark aligned, is rotated in either a clockwise or counterclockwise direction until further rotation is impossible. The numeral of the offset indicator closest to the imaginary line extending vertically downwards from the center of the wheel member hub is recorded. Thereafter, the wheel member is rotated in the opposite (clockwise/counterclockwise) direction until further rotation is not possible. Again the numeral of the offset indicator closest to the imaginary line extending vertically downwards from the center of the wheel member hub is recorded. Using a comparison chart, both numerals may determine whether the alignment mark is properly placed on the steering column.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
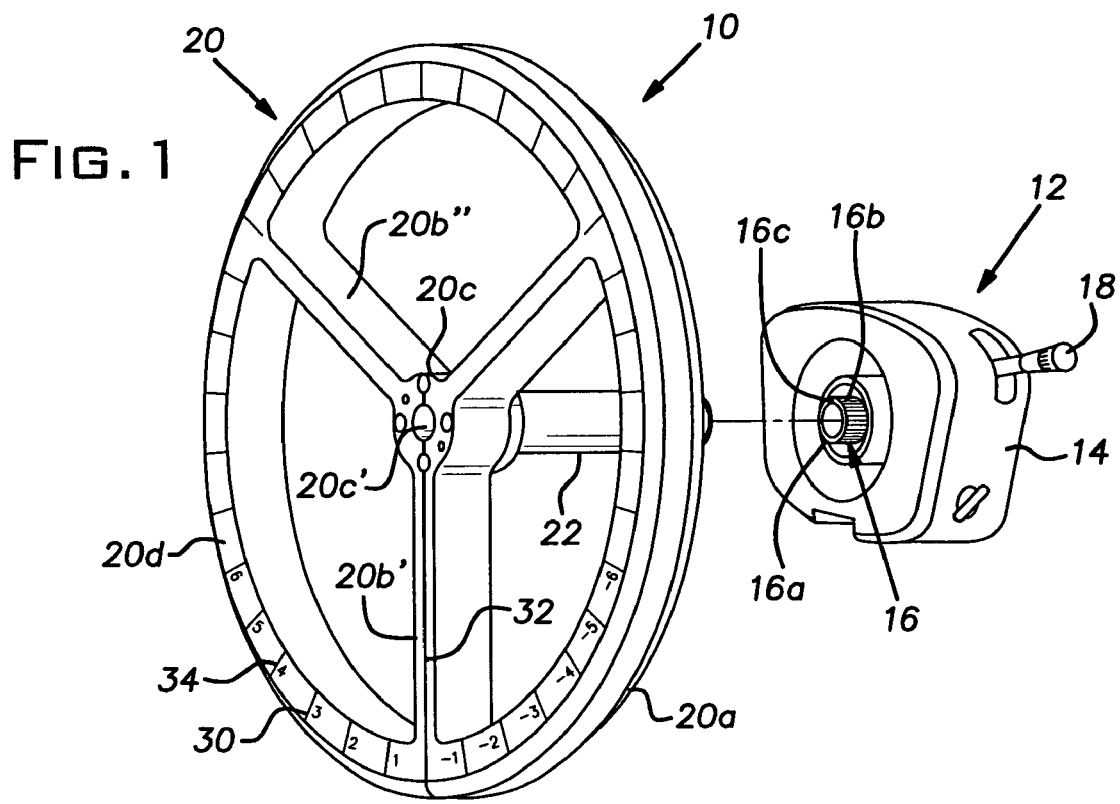
FIG. 1 is an exploded perspective view of a steering column and a master steering check fixture according to the present invention.

With reference to FIG. 1, the master steering check fixture 10 of the present invention is shown adjacent a steering column assembly 12 prior to installation thereon. The steering column assembly 12 includes a steering column housing 14, a steering column 16 disposed within the steering column housing 14, and a wiper actuator arm 18 that extends at an angle from the steering column housing 14.

An exposed upper end of the steering column 16 includes an annular upper rim 16a and an exposed peripheral or circumferential surface. A series of lengthwise extending teeth or splines 16b are formed on the peripheral surface of the steering column 16, as illustrated. The steering column teeth 16b mesh with corresponding splines provided by the steering wheel (not shown) and thereby rotatably link the steering wheel to the steering column 16, as is well known in the art.

The steering column annular upper rim 16a has a steering alignment mark 16c stamped or marked thereon by a steering column alignment and marking apparatus (not shown). The alignment mark 16c serves as a reference point by means of which the steering wheel is properly positioned on the steering column 16. More specifically, assuming that the alignment mark 16c is placed in the proper position, by aligning the steering wheel with the steering column alignment mark 16c it will be assured that the steering wheel is substantially straight (i.e., not turned appreciably to the right or left) when the vehicle is being driven straight ahead.

To that end, the master steering check fixture 10 of the present invention is adapted to be placed over the steering column 16, and thereafter manipulated in accordance with the method of the present invention to check whether the steering column alignment mark 16c is, in fact, in the desired position (i.e., a position in which the subsequently installed steering wheel will be 'straight' when the vehicle is driven straight ahead). As will be apparent from the following discussion, the master steering check fixture 10 of the present invention is designed for use with multiple vehicles, thereby simplifying on-line checking of the steering alignment mark 16c in production environments.

Figure 2:
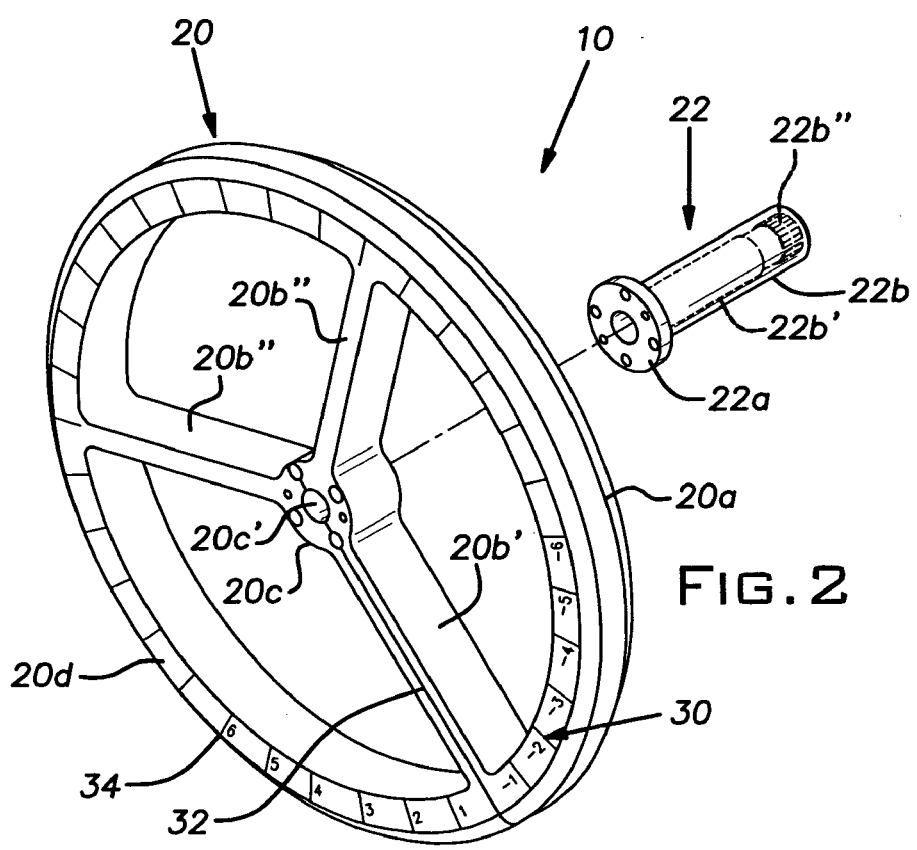
FIG. 2 is an exploded perspective view of the master steering check fixture illustrated in FIG. 1.

With reference to FIG. 2, the mastering steering check fixture 10 includes a wheel member 20, a spline adaptor 22, and a set of alignment indicators 30. The wheel member 20, which is preferably formed or machined from a solid disk of aluminum, includes a generally annular or ring-shaped outer portion 20a that is connected by a series of spoke-like arms 20b', 20b" to a central hub 20c. In the illustrated and preferred embodiment the arms include a pair of lateral arms 20b" and a center arm 20b'. Naturally, more or less than the illustrated three arms may be used without departing from the scope and spirit of the present invention.

The central hub 20c is generally circular, and defines a central opening 20c' and a series of mounting holes, as illustrated. The arms 20b', 20b" are integrally attached, at equally spaced intervals, to the peripheral surface of the central hub 20c. Although it is preferred that the central hub 20c and arms 20b', 20b" are integrally formed, it is contemplated that they can be separately formed and thereafter attached to one another, such as by welding or equivalent bonding techniques, or by mechanical fasteners.

The hub central opening 20c' permits the user to look through the hub 20c to properly orient or align the fixture 10 during placement thereof on the steering column 16. Moreover, the essentially continuous zero reference indicator 32 provided along the central arm 20b' and hub 20c permits the user to quickly and precisely visually align and orient the master steering check fixture 10 relative to the steering column 16 (i.e., the steering column alignment mark 16c) during placement of the master steering check fixture 10 on the steering column 16, described hereinafter.

The spline adaptor 22 includes a flange portion 22a and a downwardly extending shaft 22b. The flange portion 22a is sized and adapted so as to be affixed to the lower surface of the wheel member central hub 20c and, to that end, includes a series of mounting holes that match those provided in the central hub 20c. The aligned mounting holes on the hub 20c and flange portion 22a are adapted to receive mounting bolts or pins or a combination of bolts/pins. Although the spline adaptor flange portion 22a is preferably pinned and bolted to the central hub 20c, it is contemplated that the central hub 20c could be formed to integrally include the spline adaptor 22, if desired. It is further contemplated that the spline adaptor 22 could be welded to the central hub 20c if the spline adaptor 22 and central hub 20c were made of the same material.

The spline adaptor shaft 22b is generally hollow so as to define an elongated central passageway 22b' that communicates with the hub central opening 20c'. Cooperation of the hub central opening 16c and the spline adaptor central passageway 22b' permits the user to look down through the fixture 10 to see the steering column 16, which facilitates alignment of the fixture zero reference indicator 32 with the steering column alignment mark 16c.

An inner surface at the lower end of the spline adaptor shaft 22b' has a series of longitudinally oriented or extending splines or teeth formed therein, which are hereinafter referred to as fixture splines 22b". The fixture splines 22b" are essentially equivalent or identical to the splines that are formed on the steering wheel and, in use, the fixture splines 22b" align and mesh with corresponding teeth 16b provided on the steering column 16, described hereinbefore. Accordingly, when the fixture splines 22b" mate or mesh with the steering column teeth, the master steering check fixture 10 is rotatably linked to the steering column 16.

It has been determined that an acceptable position of the alignment mark 16c is one in which the steering column 16 is either centered, or within one tooth of a centered position in a clockwise or counterclockwise direction.

The face 20d of the steering check fixture 10 includes a set of alignment indicators 30. In the illustrated and preferred embodiment, a zero reference indicator 32 extends along the length of the center arm 20b', across the upper surface of the central hub 20c, and on an inner or annular surface of the central hub defining the central opening 20c', as illustrated. The zero reference indicator 32 is preferably engraved along the centerline of the center arm 20b' and hub 20c. Although desirable, provision of the zero reference indicator 32 on the inner or annular surface of the central hub may be considered optional. Further, in an alternative, although less preferred embodiment, the zero reference indicator 32 is engraved only on the upper and inner surfaces of the central hub. In a still less preferred embodiment, the zero reference indicator 32 is engraved only on the hub inner or annular surface defining the central opening 20c'.

The face 20d of the steering check fixture 10 also includes a series of offset reference indicators 34. The offset reference indicators 34 are spaced circumferentially around a section of the face 20d at equivalent intervals. Each offset reference indicator 34 comprises a line and an associated numeral. Each offset reference indicator 34 corresponds to a spline/tooth formed upon the fixture/steering column. The lines are numbered sequentially as they move away from the zero reference indicator 32. Moving clockwise from the zero reference indicator 32 the numerals (only some of which are illustrated) advance 1, 2, 3, 4, etc. Moving counterclockwise from the zero reference indicator 32, the numerals advance −1, −2, −3, −4, etc. the line of each offset reference indicator 34 extends radially across the annular outer portion of the wheel member 20.

The maximum rotation of the steering wheel on a vehicle from a centered position (i.e., FIGS. 3A–3B) to a stop position (i.e., FIGS. 4A–4B) depends upon the steering gear box of the vehicle. The gear box being used will depend upon at least the engine and transmission being used in that particular vehicle model. For example, a two-door four cylinder vehicle may have a gear box with a first maximum steering wheel rotation wherein a two-door six cylinder vehicle may have a gear box with a second, relatively smaller maximum steering wheel rotation. As will be apparent from the following, the fixture 10 of the present invention may be considered universal whereby, so long as the spline adapter 22 meshes with the steering column 16, the fixture may be used with any vehicle that has an equal turning radius (left and right).

Hereinafter, a method of using the master steering check fixture 10 to check the position of the steering column alignment mark 16c will be described.

Although it may be preferable to check the steering alignment of each vehicle, this may not be necessary. Rather, the frequency of checking the accuracy of the steering column alignment mark 16c could be varied. For example, the alignment mark accuracy may be checked with each model change, or with each shift change, or at some other predetermined interval. Further, if a problem in the alignment mark accuracy is encountered, the mark accuracy will ordinarily be checked more frequently (i.e., on every vehicle) until some confidence in the accuracy of the mark placement is restored.

Figure 3A:
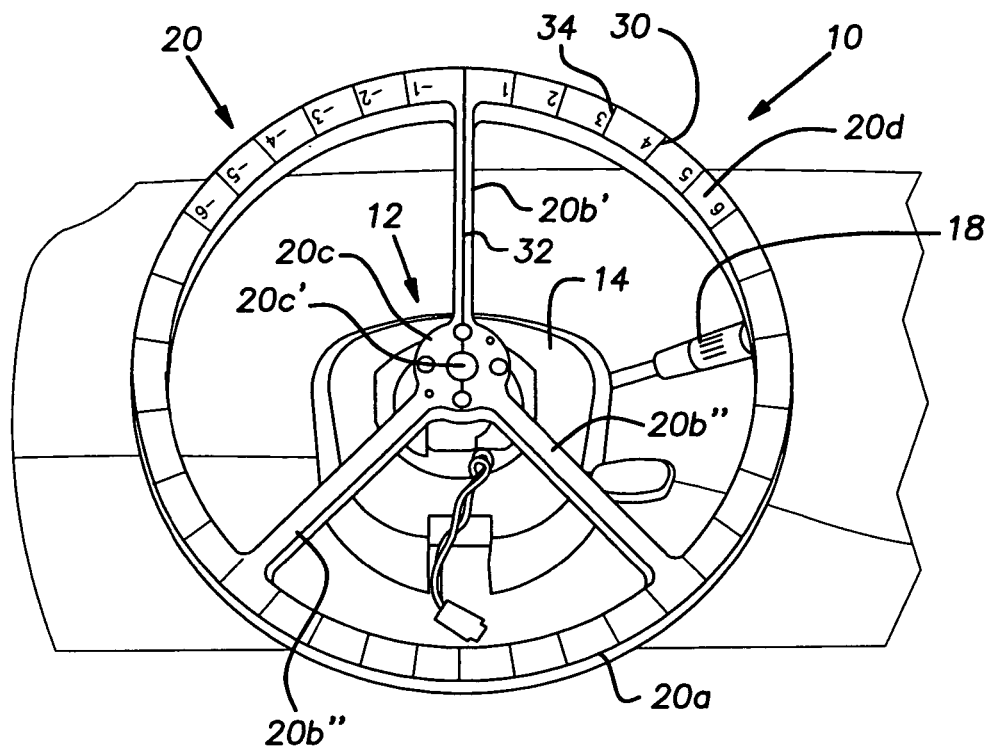
FIG. 3A is a view of the master steering check fixture disposed on the steering column in an initial position.
Figure 3B:
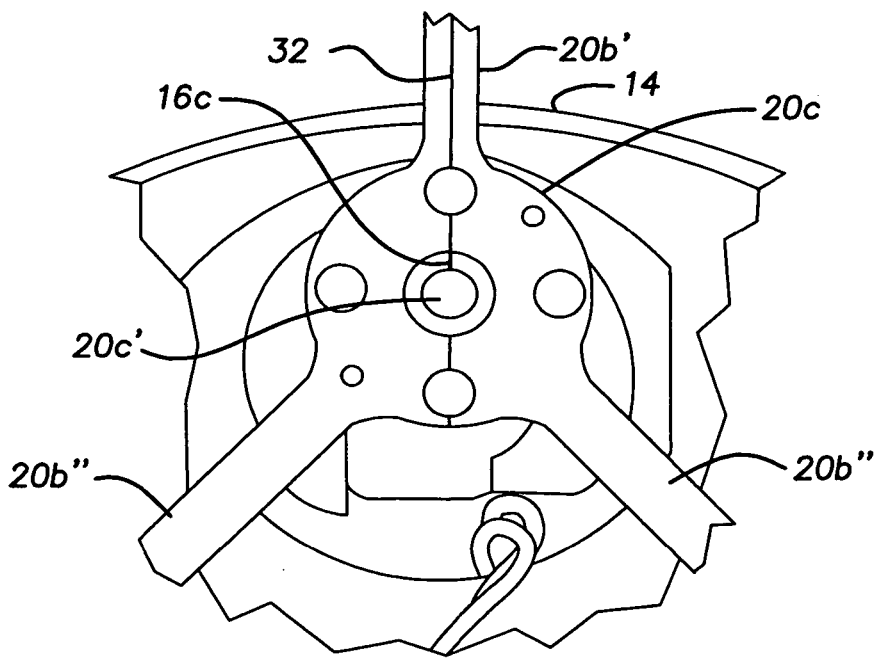
FIG. 3B is an enlarged plan view of the master steering check fixture disposed on the steering column, illustrating the alignment marks on the steering check fixture and the steering column.

The fixture 10, assembled as described hereinbefore, is aligned with the steering column 16 and placed on the steering column 16, as shown in FIG. 3A, such that the fixture splines 22b″ mesh with the steering column teeth 16b and such that the zero reference indicator 32 and the alignment mark 16c are aligned with one another, as shown in FIG. 3B. Accordingly, the fixture 10 is placed over the steering column 16 at a predetermined orientation relative to the steering column alignment mark 16c. In this regard, alignment between the zero reference indicator 32 and the alignment mark 16c is meant to indicate that the alignment mark 16c essentially forms a continuation of the zero reference indicator 32, as illustrated. In this initial position, the fixture 10 is rotatably linked with the steering column 16.

Figure 4A:
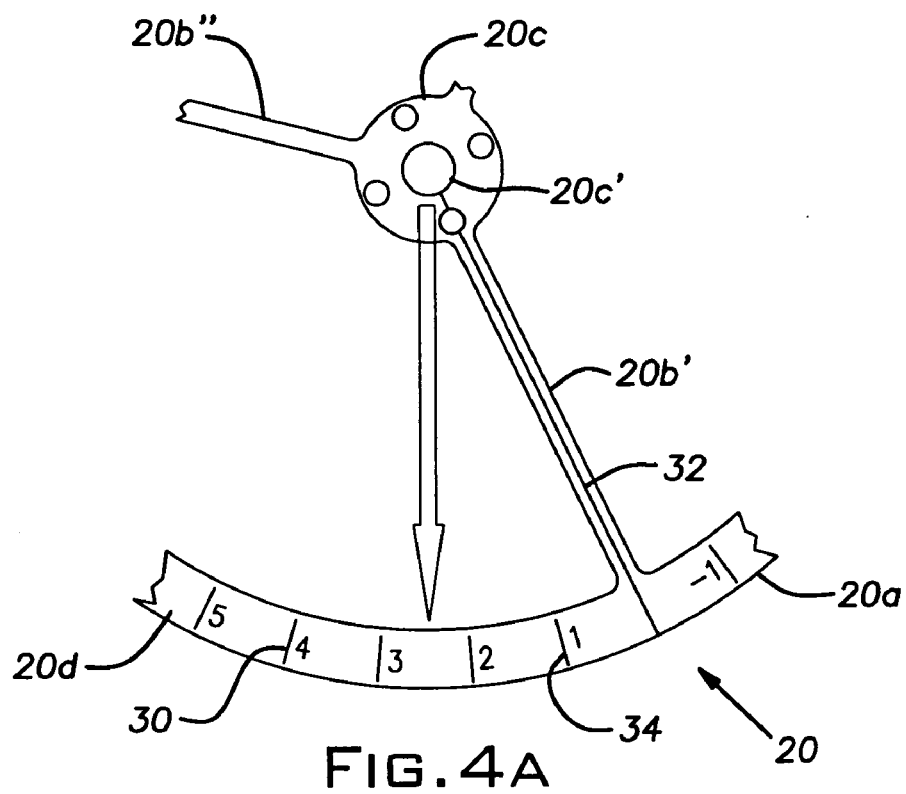
FIG. 4A is an enlarged view of the master steering check fixture after turning thereof, illustrating an offset indicator in a position relative to an imaginary vertical reference line.
Figure 4B:
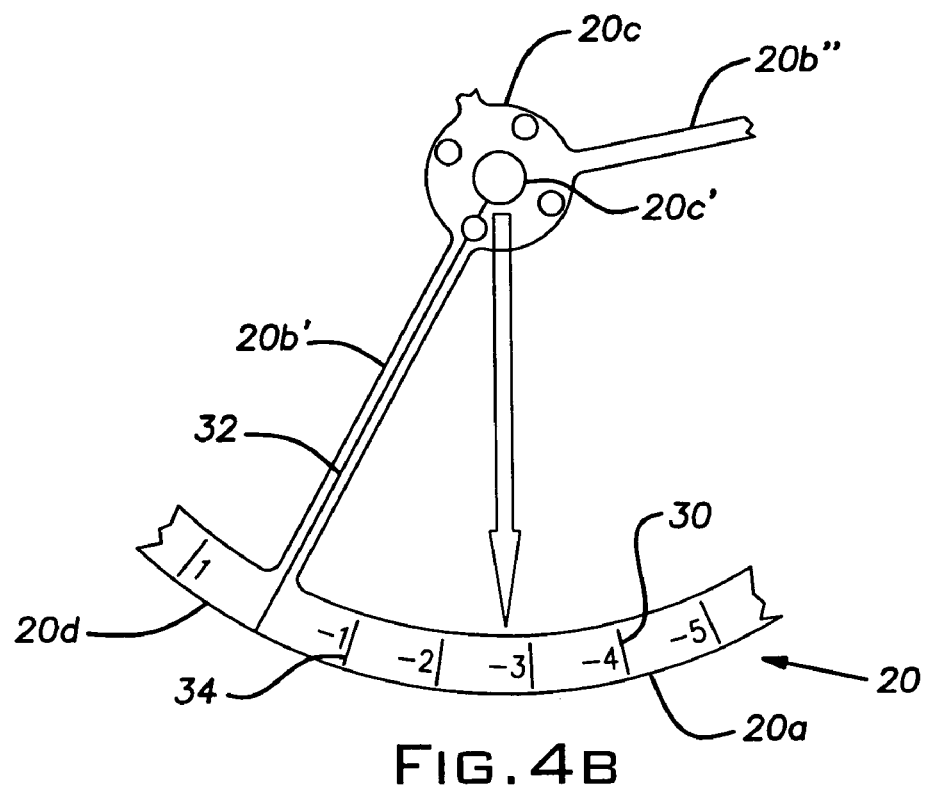
FIG. 4B is an enlarged view of the master steering check fixture after turning in an opposite direction, illustrating an offset indicator in a position relative to the vertical reference line.

Thereafter referring to FIG. 4A, the fixture 10 is rotated counterclockwise the maximum amount (i.e., until a steering column rotational stop is encountered), and then the numeral of the offset reference indicator 34 closest to an imaginary line extending vertically downwards from the center of the hub is recorded. Similarly, referring to FIG. 4B the fixture is then rotated clockwise the maximum amount (i.e., until the opposite steering column rotational stop is encountered), and then the numeral of the offset indicator closest to the imaginary line extending vertically downwards from the center of the hub is recorded.

The two numerical readings are then used in conjunction with a Correction Chart (see table below) to determine whether "corrective actions" are required. The X-axis of the Correction Chart represents the numeral reading recorded after clockwise rotation of the test fixture. The Y-axis of the Correction Chart represents the numeral reading recorded after counter-clockwise rotation of the test fixture. The intersection of the X-axis and Y-axis at specific numerical readings reveals a correction factor (e.g. −1.5, −1.0, −0.5, 0, 0.5, 1, 1.5). Correction factors fall into one of three ranges: good readings, questionable readings, or no good readings. In a preferred embodiment of the invention good readings include the range from −1 to 1, questionable readings include the range from −2 to −1.5 and 1.5 to 2, no good readings include any reading less than −2 or larger than 2. Readings from an individual test are used to determine the corresponding positions on the X and Y axes and the intersection point is then determined. Remedial actions may be taken if a no-good reading is found. Remedial actions may also be taken if a questionable reading is found.

|  | Clockwise rotation reading | | | | | | | | | | | | |
|---|---|---|---|---|---|---|---|---|---|---|---|---|---|
|  | 6 | 5 | 4 | 3 | 2 | 1 | 0 | −1 | −2 | −3 | −4 | −5 | −6 |
| Counter-clockwise rotation reading | | | | | | | | | | | | | |
| 6 | 6 | 5.5 | 5 | 4.5 | 4 | 3.5 | 3 | 2.5 | 2 | 1.5 | 1 | 0.5 | 0 |
| 5 | 5.5 | 5 | 4.5 | 4 | 3.5 | 3 | 2.5 | 2 | 1.5 | 1 | 0.5 | 0 | −0.5 |
| 4 | 5 | 4.5 | 4 | 3.5 | 3 | 2.5 | 2 | 1.5 | 1 | 0.5 | 0 | −0.5 | −1 |
| 3 | 4.5 | 4 | 3.5 | 3 | 2.5 | 2 | 1.5 | 1 | 0.5 | 0 | −0.5 | −1 | −1.5 |
| 2 | 4 | 3.5 | 3 | 2.5 | 2 | 1.5 | 1 | 0.5 | 0 | −0.5 | −1 | −1.5 | −2 |
| 1 | 3.5 | 3 | 2.5 | 2 | 1.5 | 1 | 0.5 | 0 | −0.5 | −1 | −1.5 | −2 | −2.5 |
| 0 | 3 | 2.5 | 2 | 1.5 | 1 | 0.5 | 0 | −0.5 | −1 | −1.5 | −2 | −2.5 | −3 |
| −1 | 2.5 | 2 | 1.5 | 1 | 0.5 | 0 | −0.5 | −1 | −1.5 | −2 | −2.5 | −3 | −3.5 |
| −2 | 2 | 1.5 | 1 | 0.5 | 0 | −0.5 | −1 | −1.5 | −2 | −2.5 | −3 | −3.5 | −4 |
| −3 | 1.5 | 1 | 0.5 | 0 | −0.5 | −1 | −1.5 | −2 | −2.5 | −3 | −3.5 | −4 | −4.5 |
| −4 | 1 | 0.5 | 0 | −0.5 | −1 | −1.5 | −2 | −2.5 | −3 | −3.5 | −4 | −4.5 | −5 |
| −5 | 0.5 | 0 | −0.5 | −1 | −1.5 | −2 | −2.5 | −3 | −3.5 | −4 | −4.5 | −5 | −5.5 |
| −6 | 0 | −0.5 | −1 | −1.5 | −2 | −2.5 | −3 | −3.5 | −4 | −4.5 | −5 | −5.5 | −6 |

Remedial measures include examining the steering column marking apparatus to find the cause of the incorrect mark placement. Specifically, once a discrepancy is discovered, individuals in charge of machine maintenance determine whether the steering column marking apparatus is functioning correctly. If the marking apparatus is functioning correctly, individuals in charge of production of the steering column, etc. determine if adjustment of the steering column marking apparatus is required. Adjustments are made by offsetting the marking head on the marking apparatus in proportion to the amount of error determined by the test performed using the steering check fixture.

If the individuals in charge of machine maintenance determine the marking apparatus is not functioning correctly, replacement or repair of the defective marking apparatus is performed.

For vehicles that have already been incorrectly marked by the marking apparatus before the problem was discovered, the steering column 16 may be remarked with a correct alignment mark or a note may be recorded with respect to vehicles needing corrective measures, the note including the degree of offset discovered during the master steering check and then the steering wheel may be attached in an offset manner to compensate for the problem.

Accordingly, the present invention readily permits checking of the steering column alignment mark 16c so as to insure that the subsequently installed steering wheel is centered.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An assembly for checking whether a steering column alignment mark has been accurately positioned, comprising:
   a steering column upon which the steering column alignment mark is provided, said steering column alignment mark serving as a reference for subsequent placement of a steering wheel on the steering column; and,
   a wheel member that is adapted to be rotatably secured to said steering column, said wheel member including a plurality of indicators that allow a determination to be made whether said steering column alignment mark has been accurately marked upon said steering column, said plurality of indicators including a zero reference indicator and a plurality of offset reference indicators, wherein said wheel member is initially placed over said steering column such that said zero reference indicator is aligned with said steering column alignment mark, and wherein said offset reference indicators, upon subsequent rotation of said wheel member and said steering column, are used to determine whether said steering column alignment mark has been accurately placed on said steering column.

2. The assembly according to claim 1, wherein said wheel member includes an annular outer portion, a central hub, a series of arms extending between said outer portion and the hub, and wherein at least some of the plurality of indicators are provided on said outer portion of said wheel member.

3. The assembly according to claim 2, further comprising a spline adaptor that extends from said central hub and is adapted to be rotatably secured to said steering column.

4. The assembly according to claim 1, wherein said plurality of offset reference indicators are located circumferentially around said fixture.

5. The assembly according to claim 4, wherein said wheel member includes an annular outer portion, a central hub, a series of arms extending between said outer portion and the hub, and wherein at least some of the plurality of indicators are provided on said outer portion of said wheel member.

6. The assembly according to claim 5, wherein said zero reference indicator is provided on one arm in said series of arms and said offset reference indicators are provided on said annular outer portion of said fixture.

7. The assembly according to claim 6, further comprising a spline adaptor that extends from said central hub and is adapted to be rotatably secured to said steering column.

8. A method for checking whether an alignment mark on a steering column is accurately placed, comprising the steps of:
   positioning a fixture over said steering column at a predetermined orientation relative to the alignment mark and such that said fixture is rotatably linked to said steering column;
   rotating said fixture in a first direction to a first measuring point;
   determining a first reference value from said fixture, indicative of an amount of rotation from the predetermined orientation to the first measuring point;
   rotating said fixture in a second direction to a second measuring point;
   determining a second reference value from said fixture, indicative of an amount of rotation from the predetermined orientation to the second measuring point;
   determining, based upon a comparison of the first and second offset reference values, whether said alignment mark is accurately placed; and,
   removing said fixture from said steering column.

9. The method of claim 8, wherein said first measuring point corresponds to the limit of steering column rotation in the first direction.

10. The method of claim 9, wherein said second measuring point corresponds to the limit of steering column rotation in the second direction.

11. The method according to claim 8, wherein said fixture includes a zero reference indicator, and wherein said positioning step includes the step of aligning said zero reference indicator with said alignment mark.

12. The method according to claim 8, wherein said step of determining a first reference value further comprises visualizing a line extending vertically downward from the center of said steering column and identifying where said line intersects the periphery of said fixture.

13. The method according to claim 8, wherein said step of determining a second reference value further comprises visualizing a line extending vertically downward from the center of said steering column and identifying where said line intersects the periphery of said fixture.

14. The method according to claim 8, wherein said step of comparing the first and second reference values involves utilizing a correction chart and determining the range in which the first and second reference values fall upon said correction chart.

* * * * *